United States Patent [19]
Qian

[11] Patent Number: 6,148,092
[45] Date of Patent: Nov. 14, 2000

[54] SYSTEM FOR DETECTING SKIN-TONE REGIONS WITHIN AN IMAGE

[75] Inventor: Richard Qian, Vancouver, Wash.

[73] Assignee: Sharp Laboratories of America, INC, Portland, Oreg.

[21] Appl. No.: 09/004,539

[22] Filed: Jan. 8, 1998

[51] Int. Cl.[7] .................................................. G06K 9/00
[52] U.S. Cl. .......................... 382/118; 382/164; 382/190
[58] Field of Search .................................. 382/103, 118, 382/156, 164, 190, 193, 209, 274, 276, 282, 283

[56] References Cited

U.S. PATENT DOCUMENTS

| | | | |
|---|---|---|---|
| 4,975,960 | 12/1990 | Petajan | 381/43 |
| 5,103,484 | 4/1992 | Stafford et al. | 382/1 |
| 5,130,789 | 7/1992 | Dobbs et al. | 358/75 |
| 5,130,935 | 7/1992 | Takiguchi | 364/526 |
| 5,164,992 | 11/1992 | Turk et al. | 382/2 |
| 5,187,574 | 2/1993 | Kosemura et al. | 358/108 |
| 5,280,530 | 1/1994 | Trew et al. | 382/1 |
| 5,412,738 | 5/1995 | Brunelli et al. | 382/115 |
| 5,430,809 | 7/1995 | Tomitaka | 382/173 |
| 5,450,504 | 9/1995 | Calia | 382/118 |
| 5,497,430 | 3/1996 | Sadovnik et al. | 382/156 |
| 5,557,688 | 9/1996 | Nakamura | 382/17 |
| 5,629,752 | 5/1997 | Kinjo | 382/118 |
| 5,642,431 | 6/1997 | Poggio et al. | 382/118 |
| 5,680,481 | 10/1997 | Prasad et al. | 382/190 |
| 5,719,951 | 2/1998 | Shackleton et al. | 382/217 |
| 5,781,650 | 7/1998 | Lobo et al. | 382/118 |

OTHER PUBLICATIONS

Yang et al., "a real–time face tracker" IEEE, May 1996.
Rafael C. Gonzalez, "Digital image processing" Addison–Wesley Publishing Company, pp. 225—235 1992.
Rafael C. Gonzalez, "Digital Image Processing", Color Image Processing (pp. 225—235) Jun. 1992.

*Primary Examiner*—Matthew C. Bella
*Assistant Examiner*—Sheela Chawan
*Attorney, Agent, or Firm*—Chernoff, Vilhauer, McClung & Stenzel, LLP

[57] ABSTRACT

A system detects a face within an image by receiving the image which includes a plurality of pixels, where a plurality of the pixels of the image is represented by respective groups of at least three values. The image is filtered by transforming a plurality of the respective groups of the at least three values to respective groups of less than three values, where the respective groups of the less than three values has less dependency on brightness than the respective groups of the at least three values. Regions of the image representative of skin-tones are determined based on the filtering. A first distribution of the regions of the image representative of the skin-tones in a first direction is calculated. A second distribution of the regions of the image representative of the skin-tones in a second direction is calculated, where the first direction and the second direction are different. The face within the image is located based on the first distribution and the second distribution. The estimated face location may also be used for tracking the face between frames of a video.

18 Claims, 5 Drawing Sheets

FIG. 5

SYSTEM FOR DETECTING SKIN-TONE REGIONS WITHIN AN IMAGE

BACKGROUND OF THE INVENTION

The present invention relates to a system for locating a human face within an image, and more particularly to a system suitable for real-time tracking of a human face in video sequences.

Numerous systems have been developed for the detection of a target with an input image. In particular, human face detection within an image is of considerable importance. Numerous devices benefit from automatic determination of whether an image (or video frame) contains a human face, and if so where the human face is in the image. Such devices may be, for example, a video phone or a human computer interface. A human computer interface identifies the location of a face, if any, identifies the particular face, and understands facial expressions and gestures.

Traditionally, face detection has been performed using correlation template based techniques which compute similarity measurements between a fixed target pattern and multiple candidate image locations. If any of the similarity measurements exceed a threshold value then a "match" is declared indicating that a face has been detected and its location thereof. Multiple correlation templates may be employed to detect major facial sub-features. A related technique is known as "view-based eigen-spaces," and defines a distance metric based on a parameterizable subspace of the original image vector space. If the distance metric is below a threshold value then the system indicates that a face has been detected.

An alternative face detection technique involves using spatial image invariants which rely on compiling a set of image invariants particular to facial images. The input image is then scanned for positive occurrences of these invariants at all possible locations to identify human faces.

Yang et al. in a paper entitled A Real-Time Face Tracker discloses a real-time face tracking system. The system acquires a red-green-blue (RGB) image and filters it to obtain chromatic colors (r and g) known as "pure" colors, in the absence of brightness. The transformation of red-green-blue to chromatic colors is a transformation from a three dimensional space (RGB) to a two dimensional space (rg). The distribution of facial colors within the chromatic color space is primarily clustered in a small region. Yang et al. determined after a detailed analysis of skin-color distributions that the skin color of different people under different lighting conditions in the chromatic color space have similar Guassian distributions. To determine whether a particular red-green-blue pixel maps onto the region of the chromatic color space indicative of a facial color, Yang et al. teaches the use of a two-dimensional Guassian model. Based on the results of the two-dimensional Guassian model for each pixel within the RGB image, the facial region of the image is determined. Unfortunately, the two-dimensional Guassian model is computationally intensive and thus unsuitable for inexpensive real-time systems. Moreover, the system taught by Yang et al. uses a simple tracking mechanism which results in the position of the tracked face being susceptible to jittering.

Eleftheriadis et al., in a paper entitled "Automatic Face Location Detection and Tracking for Model-Assisted Coding of Video Teleconferencing Sequences at Low Bit-Rate," teaches a system for face location detection and tracking. The system is particularly designed for video data that includes head-and-shoulder sequences of people which are modeled as elliptical regions of interest. The system presumes that the outline of people's heads are generally elliptical and have high temporal correlation from frame to frame. Based on this premise, the system calculates the difference between consecutive frames and thresholds the result to identify regions of significant movement, which are indicated as non-zero. Elliptical non-zero regions are located and identified as facial regions. Unfortunately, the system taught by Eleftheriadis et al. is computationally intensive and is not suitable for real-time applications. Moreover, shadows or partial occlusions of the person's face results in non-zero regions that are not elliptical and therefore the system may fail to identify such regions as a face. In addition, if the orientation of the person's face is away from the camera then the resulting outline of the person's head will not be elliptical and therefore the system may fail to identify the person's head. Also, if there is substantial movement within the background of the image the facial region may be obscured.

Hager et al. in a paper entitled, Real-Time Tracking of Image Regions with changes in Geometry and Illumination, discloses a face tracking system that analyzes the brightness of an image within a window. The pattern of the brightness within the window is used to track the face between frames. The system taught by Hager et al. is sensitive to face orientation changes and partial occlusions and shadows which obscure the pattern of the image. The system is incapable of initially determining the position of the face(s).

What is desired, therefore, is a face tracking system that is insensitive to partial occlusions and shadows, insensitive to face orientation and/or scale changes, insensitive to changes in lighting conditions, easy to calibrate, and can determine the initial position of the face(s). In addition, the system should be computationally simple so that it is suitable for real-time applications.

SUMMARY OF THE INVENTION

The present invention overcomes the aforementioned drawbacks of the prior art by providing a system for detecting a face within an image that receives the image which includes a plurality of pixels, where a plurality of the pixels of the image is represented by respective groups of at least three values. The image is filtered by transforming a plurality of the respective groups of the at least three values to respective groups of less than three values, where the respective groups of the less than three values has less dependency on brightness than the respective groups of the at least three values. Regions of the image representative of skin-tones are determined based on the filtering. A first distribution of the regions of the image representative of the skin-tones in a first direction is calculated. A second distribution of the regions of the image representative of the skin-tones in a second direction is calculated, where the first direction and the second direction are different. The face within the image is located based on the first distribution and the second distribution.

Using a system that determines skin-tone regions based on a color representation with reduced brightness dependency together with first and second distributions permits the face tracking system to be insensitive to partial occlusions and shadows, insensitive to face orientation and/or scale changes, insensitive to changes in lighting conditions, and can determine the initial position of the face(s). In addition, the decomposition of the image using first and second distributions allows the system to be computationally simple so that it is suitable for real-time applications.

In the preferred embodiment the estimated face location may also be used for tracking the face between frames of a video. For simplicity the face motion may be modeled as a piece-wise constant two-dimensional translation within the image plane. A linear Kalman filter may be used to predict and correct the estimation of the two-dimensional translation velocity vector. The estimated (filtered) velocity may then also be used to determine the tracked positions of faces.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 5 is a binary image of the face of FIG. 4.

DETAILED DESCRIPTION OF THE PREFERRED EMBODIMENT

Figure 1:
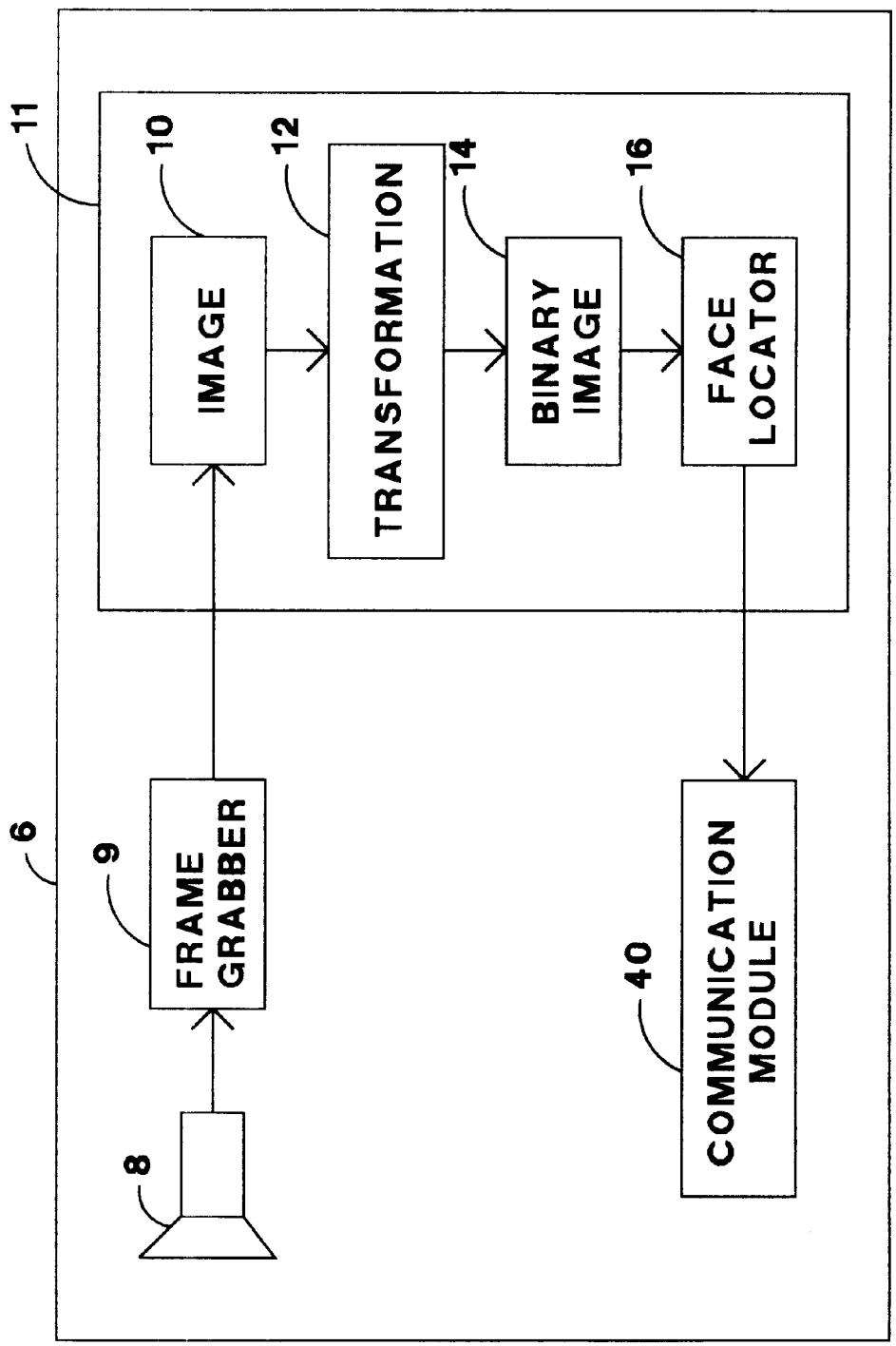
FIG. 1 is a block diagram of an exemplary embodiment of a face detection and tracking system of the present invention.

Referring to FIG. 1, a face detection and tracking system 6 includes an image acquisition device 8, such as a still camera or a video camera. A frame grabber 9 captures individual frames from the acquisition device 8 for face detection and tracking. An image processor 11 receives an image 10 from the frame grabber 9 with each pixel represented by a red value, a green value, and a blue value, generally referred to as an RGB image. The image 10 may alternatively be represented by other color formats, such as for example; cyan, magenta, and yellow; luminance, intensity, and chromaticity generally referred to as the YIQ color model; hue, saturation, intensity; hue, lightness, saturation; and hue, value, chroma. However, the RGB format is not necessarily the preferred color representation for characterizing skin-color. In the RGB color space the three colors [R, G, B] represent not only the color but also its brightness. For example, if the corresponding elements of two pixels, [R1, G1, B1] and [R2, G2, B2], are proportional (i.e., R1/R2=G1/G2=B1/B2) then they characterize the same color albeit at different brightnesses. The human visual system adapts to different brightness and various illumination sources such that a perception of color constancy is maintained within a wide range of environmental lighting conditions. Therefore it is desirable to reduce the brightness information from the color representation, while preserving accurate low dimensional color information. Since brightness is not important for characterizing skin colors under the normal lighting conditions, the image 10 is transformed by a transformation 12 (filter) to the chromatic color space. Chromatic colors (r, g), known as "pure" colors in the absence of brightness, are generally defined by a normalization process:

$$r = R/(R+G+B)$$

$$g = G/(R+G+B)$$

The effect of the transformation 12 is to map the three dimensional RGB image 10 to a two dimensional rg chromatic color space representation. The color blue is redundant after the normalization process because r+g+b=1. Any suitable transformation 12 may be used which results in a color space where the dependence on brightness is reduced, especially in relation to the RGB color space.

Figure 2:
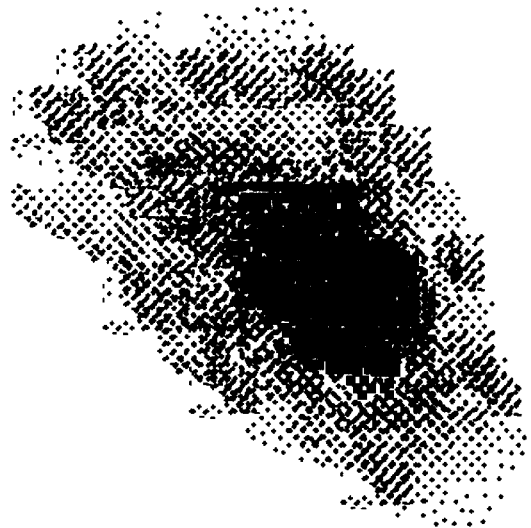
FIG. 2 is a graph of the distributions of the skin-colors of different people in chromatic color space with the grey-scale reflecting the magnitude of the color concentration.

It has also been found that the distributions of the skin-colors of different people are clustered in chromatic color space, as shown in FIG. 2. The grey-scale in FIG. 2 reflects the magnitude of the color concentration. Although skin colors of different people appear to vary over a wide range, they differ much less in color than in brightness. In other words, the skin-colors of different people are actually quite similar, while mainly differing in intensities.

The two primary purposes of the transformation 12 are to (1) facilitate distinguishing skin from other objects of an image, and (2) to detect skin tones irrespective of the particular color of the person's skin which differs from person to person and differs for the same person under different lighting conditions. Accordingly, a suitable transformation 12 facilitates the ability to track the face(s) of an image equally well under different lightning conditions even for people with different ethnic backgrounds.

Figure 3:
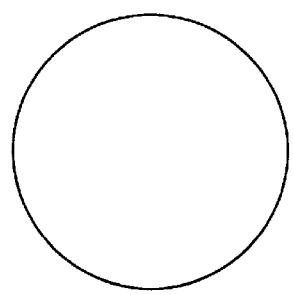
FIG. 3 is a circle centered generally within the center of the distribution shown in FIG. 2.

Referring to FIG. 3, the present inventor determined that a straightforward characterization of the chromaticity distribution of the skin tones may be a circle 20 centered generally within the center of the distribution shown in FIG. 2. Alternatively, any suitable regular or irregular polygonal shape (including a circle) may be used, such as a square, a pentagon, a hexagon, etc. The use of a polygonal shape permits simple calibration of the system by adjusting the radius of the polygonal shape. The region encompassed by the polygonal shape therefore defines whether or not a particular pixel is a skin tone. In addition, it is computationally simple to determine whether or not a particular set of rg values is within the region defined by the polygonal shape. If the rg values are within the polygonal shape, otherwise referred to as the skin-tone region, then the corresponding pixel of the image 10 is considered to be a facial feature, or otherwise having a skin tone.

Figure 4:
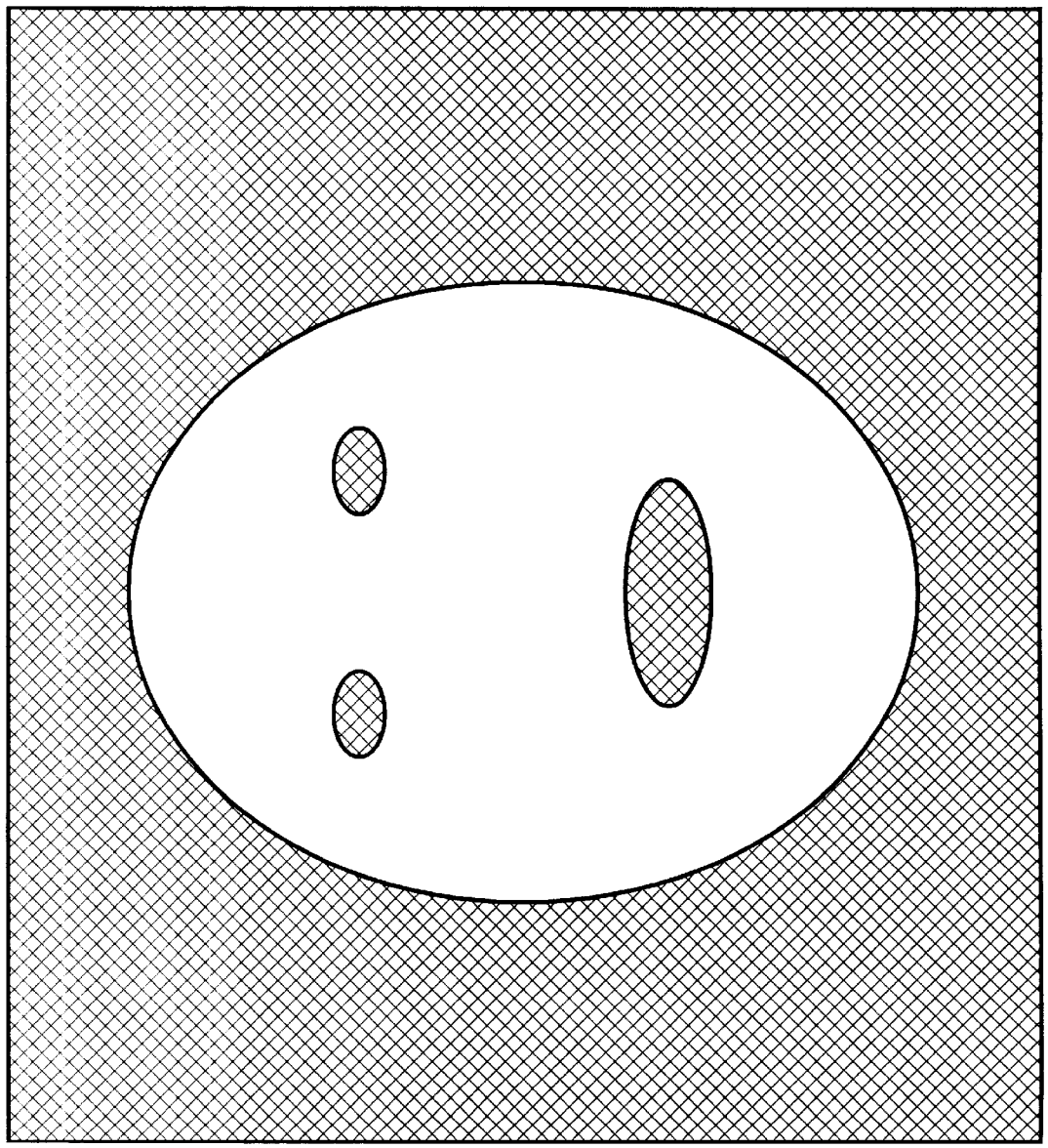
FIG. 4 is an image with a face.

Based on whether each pixel of the image 10 is within the skin tone region the system generates a binary image 14 corresponding to the image 10. The binary image 14 has a value of 1 for each pixel of the image 10 that is identified as a skin tone. In contrast, the binary image 14 has a value of 0 for each pixel of the image that is not identified as a skin tone. It is to be understood that groups of pixels may likewise be compared on a group by group basis, instead of a pixel by pixel basis, if desired. The result is a binary image 14 that contains primarily 1's in those portions of the image 10 that contain skin tones, such as the face, and primary 0's in the remaining portions of the image. It is noted that some portions of non-facial regions will have skin tone colors and therefore the binary image 14 will include a few 1's at non-face locations. The opposite is also true, facial regions may include pixels that are indicative of non-skin tones and will therefore be indicated by 0's. Such regions may include beards, moustaches, and hair. For example, the image 10 as shown in FIG. 4 may be mapped to the binary image. 14 as shown in FIG. 5.

Alternatively, the representation of the 0's and 1's may be reversed, if desired. Moreover, any other suitable representation may be used to distinguish those portions that define skin-tones from those portions that do not define skin tones. Likewise, the results of the transformation 12 may result in weighted values that are indicative of the likelihood that a pixel (or region of pixels) are indicative of skin tones.

Figure 5:
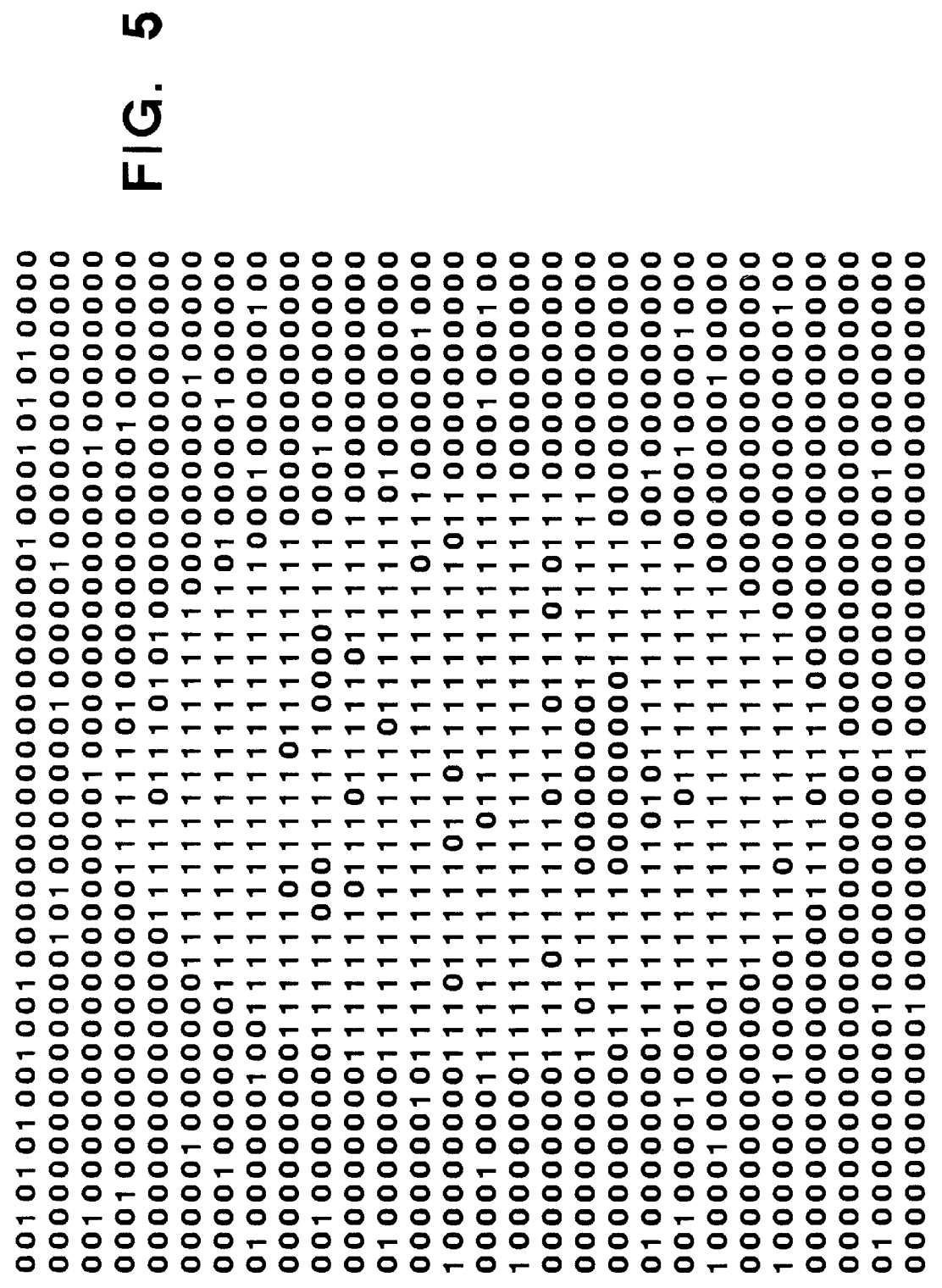

As shown in FIG. 5, the facial region of the image is generally indicated by the primary grouping of 1's. The additional 1's scattered throughout the binary image 14 do not indicate a facial feature, and are generally referred to as noise. In addition, the facial region also includes some 0's, generally referred to as noise.

Figure 6:
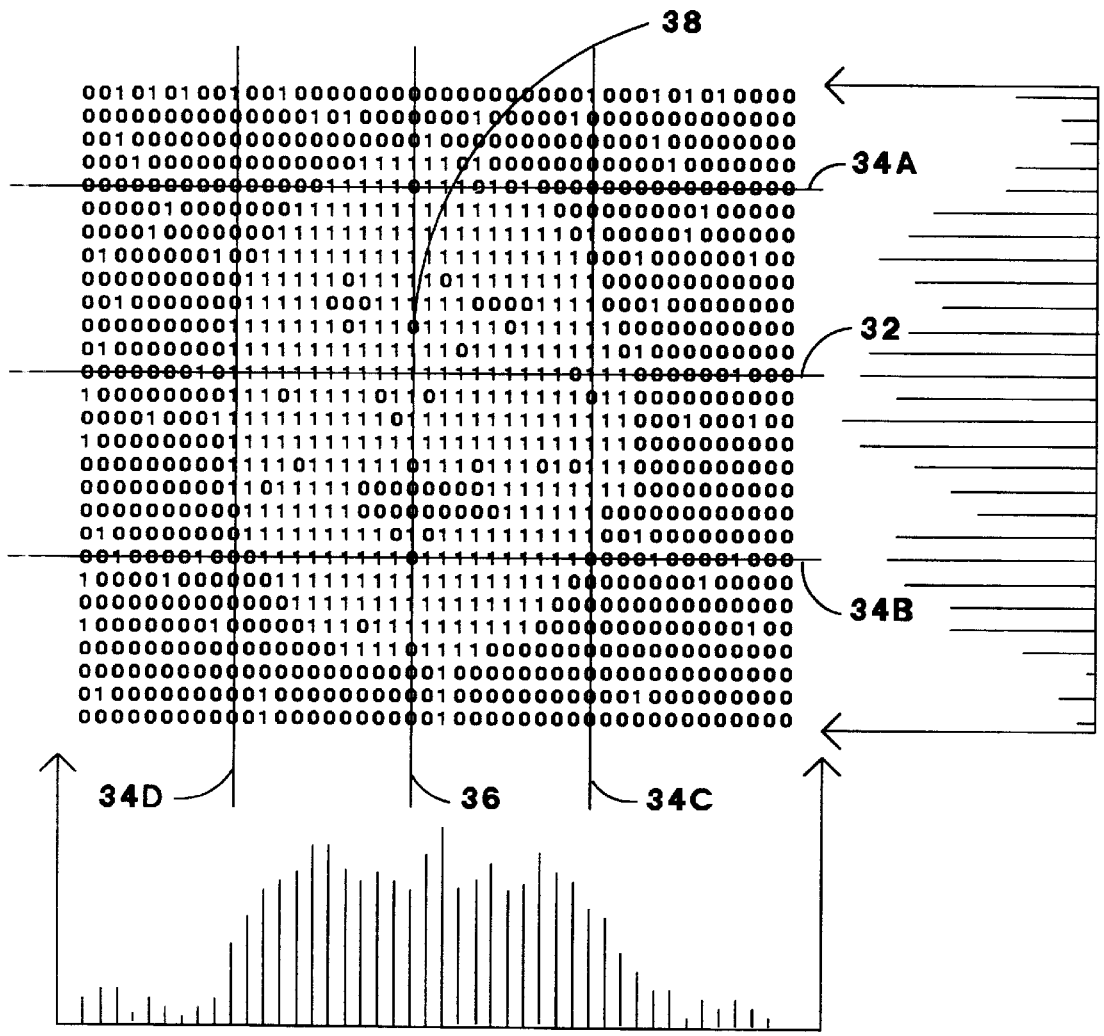
FIG. 6 is a pair of histograms of the binary image of FIG. 5 together with medians and variances for each histogram.

The present inventor came to the realization that the two dimensional binary image 14 of skin tones may further be decomposed into a pair of one dimensional models using a face locator 16. The reduction of the two dimensional representation to a pair of one dimensional representations reduces the computational requirements necessary to calculate the location of the face. Referring to FIG. 6, the mean of the distribution of the 1's (skin-tones) is calculated in both the x and y directions. The distribution is a histogram of the number of 1's in each direction. The mean may be calculated by $\mu=(1/N)\Sigma x_i$. The approximate central location 38 of the face is determined by projecting the x-mean 30 and the y-mean 32 onto the binary image 14. The variance of the distribution in each of the x and y directions is also calculated. The variance may be calculated by $\sigma^2=(1/N)\Sigma(x_i-\mu)^2$. The variances 34a–34d indicate the width of the facial feature in its respective directions. Projecting the variances 34a–34d onto the binary image 14 defines a rectangle around the facial region. The mean and variance are generally insensitive to variations for random distributions of noise. In other words, the mean and variance are robust for which such additional 1's and 0's are not statistically important. Under different lighting conditions for the same person and for different persons, the mean and variance technique defines the facial region. Moreover, the mean and variance are techniques merely requiring the summation of values which is computationally efficient.

The system may alternatively use other suitable statistical techniques on the binary image 14 in the x and y direction to determine a location indicative of the central portion of the facial feature and/or its size, if desired. Also, a more complex calculation may be employed if the data has weighted values. The system may also decompose the two-dimensional binary image into directions other than x and y.

The face locator and tracker 16 provides the general location of the center of the face and its size. The output of image processor 11 provides data to a communication module 40 which may transmit or display the image in any suitable format. The face tracking system 6 may enhance the bit rate for the portion of the image containing the face, as suggested by Eleftheriadis.

The estimated face location may also be used for tracking the face between frames of a video. For simplicity the face motion may be modeled as a piece-wise constant two-dimensional translation within the image plane. A linear Kalman filter may be used to predict and correct the estimation of the two-dimensional translation velocity vector. The estimated (filtered) velocity may then also be used to determine the tracked positions of faces.

The preferred system model for tracking the motion is:

$$x(k+1)=F(k)x(k)+w(k)$$

$$z(k+1)=H(k+1)x(k+1)+v(k+1)$$

where x(k) is the true velocity vector to be estimated, z(k) is the observed instantaneous velocity vector, w(k), v(k) are white noise, and $F(k)\equiv I$, $H(k)\equiv I$ for piece-wise constant motion. The Kalman predictor is:

$$\hat{x}(k+1|k)=F(k)\hat{x}(k|k), \hat{x}(0|0)=0$$

$$\hat{z}(k+1|k)=H(k+1)x(k+1|k)$$

The Kalman corrector is:

$$\hat{x}(k+1|k+1)=\hat{x}(k+1|k)+K(k+1)\Delta z(k+1|k)$$

$$\Delta z(k+1|k)=z(k+1)-\hat{z}(k+1|k)$$

where K(k+1) is the Kalman gain. The Kalman gain is computed as:

$$K(k+1)=P(k+1|k)H^T(k+1) [H(k+1)P(k+1|k)H^T(k+1)+R(k+1)]^{-1}$$

The covariances are computed as:

$$P(k+1|k)=F(k)P(k|k)F^T(k)+Q(k), P(0|0)=P_0$$

$$P(k+1|k+1)=[I-K(k+1)H(k+1)]P(k+1|k)$$

where $Q(k)=E[w(k)w^T(k)]$, $R(k)=E[v(k)V^T(k)]$ and $P_0=E[x(0)x^T(0)]$.

In the presence of lighting fluctuation and image noise, the tracked face image may be jittering. A nonlinear filtering module therefore may be included in the tracking system to remove the undesirable jittering. A simple implementation of the nonlinear filtering module is to cancel any movement of the tracked face which is smaller in magnitude than a prescribed threshold and shorter in duration than another prescribed threshold.

A particular application suitable for the face detection and tracking system described herein involves a video phone. Other suitable device may likewise be used. An image of the background without a person present is obtained by the system. Thereafter images are obtained in the presence of the person. Each image obtained is compared against the background image to distinguish the foreground portion of the image from the background image previously obtained. The recipient's video phone has a nice background image displayed thereon. The foreground, which is presumably the person, is transmitted to and overlayed on the nice background image of the recipient's video phone on a frame-by-frame manner. The location of the face is determined by the face tracking system to smooth out the movement of the person and remove jitter.

Alternatively, the nice background image may be transmitted to the recipient's video phone, and is preferably transmitted only once per session. This provides the benefit of disguising the actual background environment and potentially reducing the bandwidth requirements.

The system may be expanded using the same teachings to locate and track multiple faces within an image.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of detecting a skin-tone region within an image comprising the steps of;

(a) receiving said image including a plurality of pixels of said image is represented by respective groups of at least three values, said values are in a first color space;

(b) filtering said image by transforming a plurality of said respective groups of said at least three values in said first color space to respective groups of less than three values in a second color space, where said respective groups of said less than three values has less dependency on brightness than said respective groups of said at least three values;

(c) determining regions of said image in said second color space representative of skin-tones based on said filtering of step (b);

(d) calculating a first distribution of said regions of said image in a color space different than said second color space representative of said skin-tones in a first direction;

(e) calculating a second distribution of said regions of said image in said different color space of step (d) representative of said skin-ton in a second direction, where said first direction and said second direction are different; and (f) locating said skin-tone region within said image based on said first distribution and said second distribution.

2. The method of claim 1 where said image includes from a video containing multiple images.

3. The method of claim 1 where said image includes a human face.

4. The method of claim 1 where said at least three values includes a red value, a green value, and a blue value.

5. The method of claim 4 where said respective groups of less than three values includes, a r value defined by said red value divided by the summation of said red value, said green value, and said blue value, and a g value defined by said green value divided by the summation of said red value, said green value, and said blue value.

6. The method of claim 1 wherein at least one of said regions is an individual pixel of said image.

7. The method of claim 1 wherein said determining of step (c) is based on a polygonal shape.

8. The method of claim 1 wherein said determining of step (c) is based on a circle.

9. The method of claim 1 wherein at least one of said first distribution and said second distribution is a histogram.

10. The method of claim 1 wherein said first distribution is in a x-direction.

11. The method of claim 10 wherein said second distribution is in a y-direction.

12. The method of claim 11 wherein said first distribution and said second distribution are in orthogonal directions.

13. The method of claim 1 wherein said first distribution and said second distribution are independent of each other.

14. The method of claim 1 further comprising the steps of:

(a) calculating a first generally central location of said first distribution;

(b) calculating a first generally central location of said second distribution; and (c) locating said face based on said first generally central location of said first distribution and said first generally central location of said second distribution.

15. The method of claim 14 wherein at least one of said first generally central location of said first distribution and said first generally central location of said second distribution is a mean.

16. The method of claim 14 wherein the size of said face is based on the variance of said first distribution and the variance of said second distribution.

17. The method of claim 1 wherein said face is tracked between subsequent frames.

18. The method of claim 17 wherein jitter movement of said face is reduced between said subsequent frames.

* * * * *

UNITED STATES PATENT AND TRADEMARK OFFICE
CERTIFICATE OF CORRECTION

PATENT NO. : 6,148,092
DATED : November 14, 2000
INVENTOR(S) : Richard Qian

It is certified that error appears in the above-identified patent and that said Letters Patent is hereby corrected as shown below:

<u>Column 4,</u>
Line 59, change "image. 14 as" to -- image 14 as --

Signed and Sealed this

Twenty-first Day of May, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,148,092
DATED : November 14, 2000
INVENTOR(S) : Richard Qian

It is certified that error appears in the above-identified patent and that said Letters Patent is hereby corrected as shown below:

Column 7,
Line 15, change "skin-ton" to -- skin-tone --

Signed and Sealed this

Fifteenth Day of October, 2002

Attest:

Attesting Officer

JAMES E. ROGAN
Director of the United States Patent and Trademark Office